Oct. 18, 1932.  R. J. OLANDER  1,882,870
FRICTION SHOCK ABSORBING MECHANISM
Filed Feb. 9, 1931
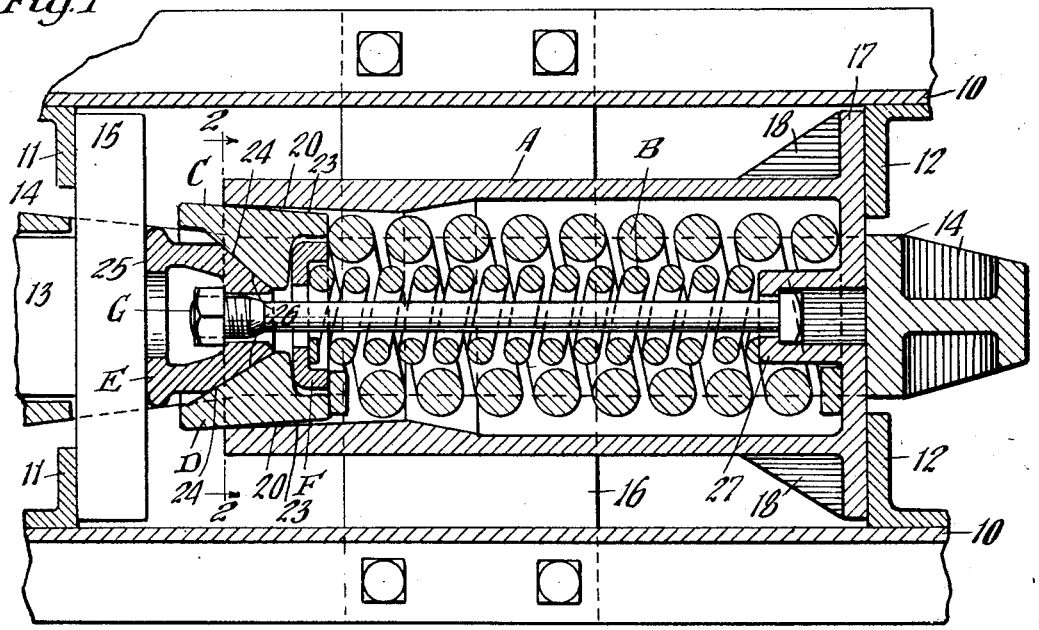
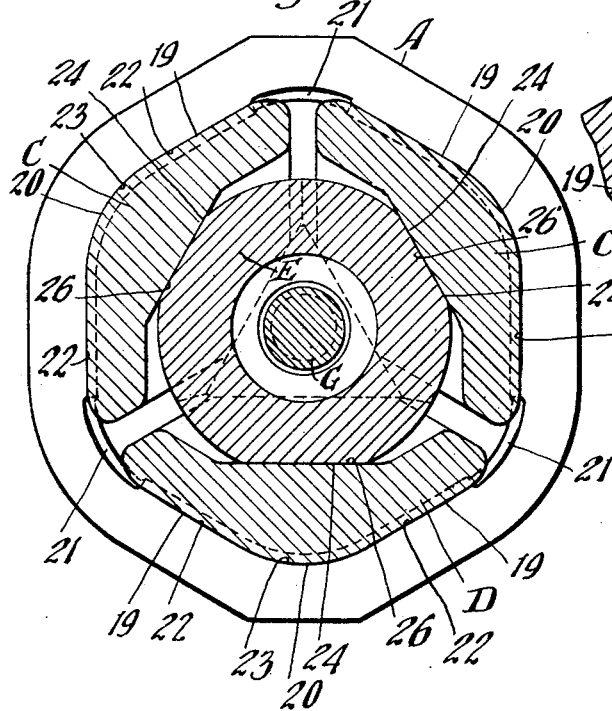
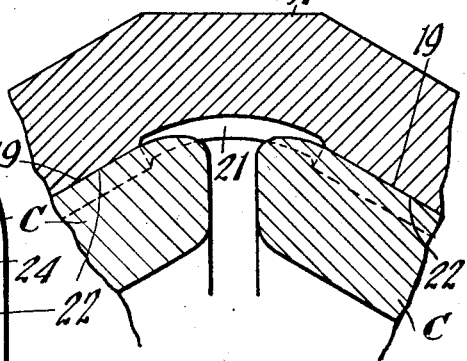
Witness
Wm. Geiger
Inventor
Roland J. Olander
By Henry Fuchs
Atty.

Patented Oct. 18, 1932

1,882,870

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 9, 1931. Serial No. 514,459.

This invention relates to improvements in friction shock absorbing mechanisms.

One object of the invention is to provide a friction shock absorbing mechanism including a friction shell and cooperating friction shoes, the shell being provided with interior longitudinal friction surfaces with which the shoes cooperate, the cooperating surfaces of the shell and shoes being of V-shaped cross section to properly guide the shoes in their movement, and the shell surfaces being raised with respect to the interior of the shell, and the shoes having the side edges thereof projecting beyond the corresponding edges of the raised surfaces, thereby permitting uniform wear of the friction shell surfaces without any danger of the shoes binding or sticking during service.

Another and more specific object of the invention is to provide, in a friction shock absorbing mechanism of the character indicated, a friction shell of hexagonal type having friction shoes cooperating therewith, wherein adjacent interior parts of walls of the shell present substantially V-shaped friction surfaces, and each shoe is provided with a V-shaped friction surface cooperating with a corresponding shell surface, and wherein the shell walls are interiorly recessed or grooved longitudinally at the corners thereof between the adjacent V-shaped friction surfaces to provide clearance for the longitudinal side edges of the shoes, thereby preventing contact of said side edges of the shoes with the shell walls and entirely eliminating all danger of sticking or binding of the shoes as wear of the shell friction surfaces occurs in service.

Other objects of the invention will more clearly appear from the description and claims hereinafter following.

In the drawing forming a part of this specification, Figure 1 is a horizontal longitudinal sectional view of a portion of a railway draft rigging illustrating my improvements in connection therewith, the section through the friction shoes and wedge being in two radial planes at an angle of 120°. Figure 2 is a transverse vertical sectional view corresponding substantially to the line 2—2 of Figure 1, said view being on an enlarged scale and illustrating the friction shock absorbing mechanism proper. Figure 3 is a transverse vertical sectional view, on a still further enlarged scale, of a portion of the friction shell and portions of two cooperating friction shoes, said section being taken inwardly of the section shown in Figure 2.

In said drawing, 10—10 indicate channel-shaped center or draft sills of a railway car underframe, to the inner sides of which are secured the usual front stop lugs 11—11 and rear stop lugs 12—12. The inner end of the standard coupler shank is designated at 13, and a hooded yoke 14 of well-known form is operatively connected to the coupler in the usual manner. My improved friction shock absorbing mechanism and the usual front main follower 15 are disposed within the yoke, and the yoke in turn is supported by the usual saddle plate 16 secured to the bottom flange of the draft sills.

My improved shock absorbing mechanism proper comprises, broadly, a friction casing or shell A; a main spring resistance B; three friction shoes C—C and D; a wedge block E; a spring follower F; and a retainer bolt G.

The friction shell or casing A, as most clearly shown in Figure 2, is of hexagonal cross section having a rear follower member 17 formed integral therewith, said rear follower forming the rear end wall of the shell and, cooperating with the rear stop lugs 12—12 in the usual manner. As most clearly shown in Figure 1, the projecting side sections of the follower 17 are reinforced by longitudinally extending tapering horizontal webs 18—18 which are integral with the side walls of the friction shell. At the forward end, the friction shell is provided with six interior flat friction surfaces 19—19 which converge inwardly thereof. The flat friction surfaces 19—19 are arranged symmetrically about the longitudinal axis of the shell and provide three sets of V-shaped friction surfaces, each comprising two flat faces 19 and a connecting curved face 20. The curved faces 20 are also converged inwardly of the shell and each is of varying radius. The particular shape and formation of the friction surfaces corresponds to those illustrated in Patent No.

1,780,358, granted to William H. Miner, November 4, 1930, and as described in said patent, the maximum radius is at the outer end of each curved surface, the radius of the curve being gradually lessened inwardly of the shell.

At the corners of the shell between the adjacent V-shaped friction surfaces, the shell is interiorly cut away or grooved, as indicated at 21, thereby providing clearance for the side edges of the friction shoes as hereinafter more fully pointed out. As will be evident, due to the friction shell being provided with the interior longitudinally arranged grooves or recesses 21—21 between the V-shaped friction surfaces, these surfaces are in effect raised with respect to the inner surface proper of the shell. As most clearly illustrated in Figure 2, the outer walls of the grooves 21—21 also converge inwardly of the shell.

The three friction shoes C—C and D are similarly designed, except as hereinafter pointed out. Each shoe is provided on its exterior with a pair of flat friction surfaces 22—22 which merge with the curved surface 23 therebetween, the flat surfaces 22—22 cooperating with the friction faces 19—19 of the corresponding V-shaped friction surface of the shell and the curved surface 23 of said shoe corresponding in shape to the curved surface 20 between said shell faces and fitting the same in the full release position of the shoes, that is, the position shown in Figures 1 and 2. As clearly shown in Figure 2, the shoes are of greater width than the cooperating V-shaped friction surfaces and overlap these surfaces, the longitudinal side edges of each shoe partially overhanging the grooves 21—21 at the opposite sides of each V-shaped shell surface. In the normal full release position of the parts, the adjacent shoes have their edges spaced apart, as shown in Figure 2, so as to provide sufficient clearance to permit the full inward movement of the shoes during compression of the mechanism without actual engagement of the side edges of the same.

On the inner side each shoe is provided with an enlargement having an outer wedge face 24 thereon. As clearly shown in Figure 1, the wedge faces 24—24 of the shoes C—C are inclined at a blunter angle with respect to the longitudinal axis of the mechanism than the wedge face 24 of the shoe D.

The wedge member E is in the form of a block having a flat outer end face 25 which bears directly on the front follower 15. At the inner end the wedge block is provided with three wedge faces 26—26 which are arranged symmetrically about the longitudinal axis of the mechanism and are converged inwardly of the same. Two of the wedge faces 26—26 are correspondingly inclined to the blunt wedge faces 24—24 of the shoes C—C and cooperate therewith, and the remaining wedge face 26 of the block is disposed at a relatively keen angle and cooperates with the wedge face 24 of the shoe D.

The main spring resistance B comprises a relatively heavy outer coil and a lighter inner coil, the outer coil having the rear end thereof bearing directly on the rear wall of the friction shell. The inner coil has the inner end thereof bearing on an inwardly projecting hollow boss 27 on the end wall of the shell. The spring cap F is interposed between the front end of the inner coil of the spring resistance and the enlargements of the friction shoes C—C and D. The outer coil of the spring bears at its forward end both on the spring cap F and on the inner ends of the shoes.

The mechanism is held assembled and of overall uniform length by the retainer bolt G which has the head thereof anchored to the hollow boss 27 and the nut thereof anchored to the wedge block E, the nut being accommodated in a recess provided in said wedge.

The operation of my improved shock absorbing mechanism, during the compression stroke, is as follows: During relative approach of the front follower 15 and the friction shell A, the wedge E is forced inwardly of the shell, thereby setting up a wedging action between the same and the friction shoes C—C and D and forcing the latter inwardly of the shell against the resistance of the spring B. Due to the converging surfaces of the shell, the shoes C—C and D will be forced laterally toward each other a slight amount, that is, a differential action will be set up which will slightly accelerate the movement of the shoes. In a release action, the collapse of the wedge shoe friction system is ensured by reason of the blunt angle faces on the wedge and the shoes C—C, which in turn permits all of the parts to be moved outward to normal position under the influence of the spring resistance B. As will be evident during the inward movement of the shoes, the longitudinal side edges of the same will be maintained out of contact with the walls of the friction shell due to the clearance provided by the longitudinal grooves or recesses 21—21—21 between the V-shaped friction surfaces. All binding and sticking of the shoes is thus effectively eliminated.

From the preceding description taken in connection with the drawing, it will be evident that I have provided simple and efficient means which eliminates sticking or binding of the cooperating friction surfaces of the shoes and shell, which would otherwise occur incident to wear of these parts. The wear is entirely taken care of by the raised arrangement of the interior surfaces of the shell, the elevation of these surfaces being sufficient to take care of all wear incident to service during the life of the mechanism without the longitudinal side edges of the shoes coming into contact with the walls of the shell. True flat surface contact is thereby at all times provided between the shoes and the shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a one-piece friction shell having a plurality of interior friction surfaces extending lengthwise thereof arranged symmetrically about the longitudinal axis of the shell and formed directly on the walls of the shell; of a plurality of friction shoes cooperating respectively with said friction surfaces, adjacent shoes having the opposed longitudinal side edges thereof spaced apart, and said shell having longitudinal interior grooves between adjacent friction surfaces thereof, which the side edges of the shoes overhang, said grooves providing clearance for the longitudinal side edges of said shoes; a wedge block having wedging engagement with the shoes; and a main spring resistance opposing inward movement of the shoes.

2. In a friction shock absorbing mechanism, the combination with a friction shell of one-piece construction and of substantially hexagonal transverse cross section, said shell having six interior flat friction faces formed directly on the walls thereof, said faces converging inwardly of said shell and being symmetrically arranged with respect to the longitudinal axis thereof, said friction faces being arranged in three sets, each comprising a pair of adjacent faces disposed at an angle to each other, the adjacent longitudinal edges of each pair merging with an appreciably curved face, whereby three friction surfaces of substantially V-shaped section, symmetrically arranged with respect to said axis are provided, each comprising two adjacent flat faces with an intervening curved face, said shell being interiorily recessed at the corners between the longitudinal edges of adjacent V-shaped friction surfaces; a friction shoe cooperating with and fitting each V-shaped shell surface, said shoe being of greater width than said co-operating V-shaped shell surface and having the longitudinal side edges thereof overlapping the side edges of said shell surface and partly overhanging the recesses at opposite sides of the latter; a spring resistance opposing inward movement of the shoes; and means having wedging engagement with the shoes.

In witness that I claim the foregoing I have hereunto subscribed my name this 7th day of February, 1931.

ROLAND J. OLANDER.